United States Patent
Iida et al.

(10) Patent No.: US 6,943,468 B2
(45) Date of Patent: Sep. 13, 2005

(54) TURBOCHARGER WITH ROTATING ELECTRIC MACHINE

(75) Inventors: Tatsuo Iida, Anjo (JP); Takayoshi Kitada, Mishima (JP); Yutaka Bitoh, Chiga-gun (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/958,399

(22) Filed: Oct. 6, 2004

(65) Prior Publication Data

US 2005/0082941 A1 Apr. 21, 2005

(30) Foreign Application Priority Data

Oct. 17, 2003 (JP) ........................................ 2003-357273

(51) Int. Cl.[7] ................................................. H02K 9/00
(52) U.S. Cl. ............................ 310/54; 310/59; 310/261
(58) Field of Search ........................ 310/52–64, 156.28, 310/156.29, 261; 60/597, 605.1–605.3, 623, 624

(56) References Cited

U.S. PATENT DOCUMENTS

| | | | | |
|---|---|---|---|---|
| 2,793,506 A | * | 5/1957 | Moody | 62/505 |
| 3,242,359 A | * | 3/1966 | Anderson | 310/52 |
| 3,742,265 A | * | 6/1973 | Smith, Jr. | 310/52 |
| 3,790,309 A | * | 2/1974 | Volz | 417/368 |
| 5,121,605 A | * | 6/1992 | Oda et al. | 60/608 |
| 5,605,045 A | * | 2/1997 | Halimi et al. | 60/607 |
| 5,880,547 A | * | 3/1999 | Shoykhet | 310/91 |
| 6,085,527 A | * | 7/2000 | Woollenweber et al. | 60/607 |
| 6,450,781 B1 | * | 9/2002 | Petrovich et al. | 417/350 |
| 6,703,747 B2 | * | 3/2004 | Kawamura | 310/179 |

FOREIGN PATENT DOCUMENTS

| | | |
|---|---|---|
| JP | A 2000-145469 | 5/2000 |
| JP | A 2001-25209 | 1/2001 |

\* cited by examiner

*Primary Examiner*—Dang Le
(74) *Attorney, Agent, or Firm*—Oliff & Berridge, PLC

(57) ABSTRACT

A turbocharger with a rotating electric machine includes a turbine rotor which constitutes a portion of a rotating member of the turbocharger; a compressor impeller which constitutes a portion of the rotating member of the turbocharger; a rotating electric machine which includes a stator and a rotor that constitutes a portion of the rotating member of the turbocharger; a shaft which supports the turbine rotor at one end and the compressor impeller at the other end, and which supports the rotor of the rotating electric machine at an intermediate portion; bearings each of which has an inner race and an outer race, and one of which supports the shaft at a portion between the one end and the intermediate portion, and the other of which supports the shaft at a portion between the other end and the intermediate portion; and a cylindrical member which encases the rotor of the rotating electric machine at a center portion and which contacts the inner race of one of the two bearings at one end portion and the inner race of the other of the two bearings at the other end portion.

10 Claims, 3 Drawing Sheets

TURBOCHARGER WITH ROTATING ELECTRIC MACHINE

INCORPORATION BY REFERENCE

The disclosure of Japanese Patent Application No. 2003-357273 filed on Oct. 17, 2003 including the specification, drawings and abstract is incorporated herein by reference in its entirety.

BACKGROUND OF THE INVENTION

1. Field of the Invention

The invention relates to a turbocharger for an internal combustion engine. More particularly, the invention relates to a turbocharger with a rotating electric machine, which includes a rotating electric machine such as an electric motor or an electric motor-generator.

2. Description of the Related Art

A turbocharger with a rotating electric machine is generally configured to include a rotating member of the turbocharger in which a shaft, that supports a turbine rotor at one end and a compressor impeller at the other end and that supports a rotor of the rotating electric machine at an intermediate portion, is supported by bearings, each of which has an inner race and an outer race, at a portion between the one end and the intermediate portion and a portion between the other end and the intermediate portion. Japanese Patent Laid-Open Publication No. 2000-145469 discloses a technology in which a rotor of a rotating electric machine is reinforced by being covered with a reinforcing sleeve in order to prevent damage to a magnet constituting the rotor of the rotating electric machine caused by a strong centrifugal force due to high speed rotation of a rotating member of a turbocharger, in a turbocharger with a rotating electric machine having the above-mentioned configuration. Also, this publication discloses a technology in which a tube-like spacer is provided in each of a portion between one end of the rotor of the rotating electric machine and a bearing adjacent thereto and a portion between the other end of the rotor of the rotating electric machine and a bearing adjacent thereto, in order to maintain an axial position of the rotor of the rotating electric machine in the rotating member of the turbocharger.

Meanwhile, heat due to eddy currents is generated in a rotor of a rotating electric machine. Accordingly, Japanese Patent Laid-Open Publication 2001-25209 discloses a technology in which a spiral hole penetrating the rotor in the axial direction is formed in the rotor and air or a cooling medium flows through the spiral hole.

In order to stably operate a turbocharger with a rotating electric machine, it is requested that heat generated in the rotating electric machine be appropriately released. It is also requested that a magnet of a rotor of the rotating electric machine containing relatively brittle material be protected from damage due to a centrifugal force, an axial position of the rotor of the rotating electric machine be stably maintained in the rotating member of the turbocharger, and the like. Namely, these requests to the turbocharger with a rotating electric machine need to be satisfied with a simple configuration.

SUMMARY OF THE INVENTION

The invention is made in the light of the above-mentioned circumstances. According to an aspect of the invention, there is provided a turbocharger with a rotating electric machine, including a cylindrical member extending between bearings, to be described. The turbocharger with a rotating electric machine includes a turbine rotor which constitutes a portion of a rotating member of the turbocharger; a compressor impeller which constitutes a portion of the rotating member of the turbocharger; a rotating electric machine which includes a stator and a rotor that constitutes a portion of the rotating member of the turbocharger; a shaft which supports the turbine rotor at one end and the compressor impeller at the other end, and which supports the rotor of the rotating electric machine at an intermediate portion; bearings each of which has an inner race and an outer race, and one of which supports the shaft at a portion between the one end and the intermediate portion, and the other of which supports the shaft at a portion between the other end and the intermediate portion; and a cylindrical member which encases the rotor of the rotating electric machine at a center portion and which contacts the inner race of one of the two bearings at one end portion and the inner race of the other of the two bearings at the other end portion.

In the turbocharger with a rotating electric machine having the above-mentioned configuration, that includes the rotating member in which the shaft, that supports the turbine rotor at one end and the compressor impeller at the other end and that supports the rotor of the rotating electric machine at the intermediate portion, is supported by the bearings, each of which has the inner race and the outer race, at the portion between one end and the intermediate portion and at the portion between the other end and the intermediate portion, when the turbocharger is configured to have the cylindrical member which encases the rotor of the rotating electric machine at the center portion and which contacts the inner race of one of the two bearings at one end portion and the inner race of the other of the two bearings at the other end portion, the cylindrical member produces an effect of protecting the magnet of the rotor of the rotating electric machine from damage due to a centrifugal force and an effect of recovering heat generated in the rotating electric machine by fully encasing the rotor of the rotating electric machine at the center portion. Also, by contacting the inner race of one of the two bearings at one end portion and the inner race of the other of the two bearings at the other end portion while fully enclosing the rotor of the rotating electric machine at the center portion, it is possible to simultaneously achieve an effect of stably maintaining the axial position of the rotor of the rotating electric machine in the rotating member of the turbocharger and an effect of transferring heat collected by the rotor of the rotating electric machine at the center portion and releasing the heat to a cooling system using lubricating oil. The cylindrical member includes the center portion which fully encases the rotor of the rotating electric machine, integral with the portion extending from the center portion to one of the bearings and the portion extending from the center portion to the other bearing. Therefore, when the center portion is subjected to a force applied in a radial pattern due to a centrifugal force of the rotor of the rotating electric machine, strength and durability of the center portion of the cylindrical member, which suppresses the force applied in the radial pattern, largely increases compared with the case where the sleeve which covers only the rotor portion of the rotating electric machine is used.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail in terms of exemplary embodiments.

Figure 1:
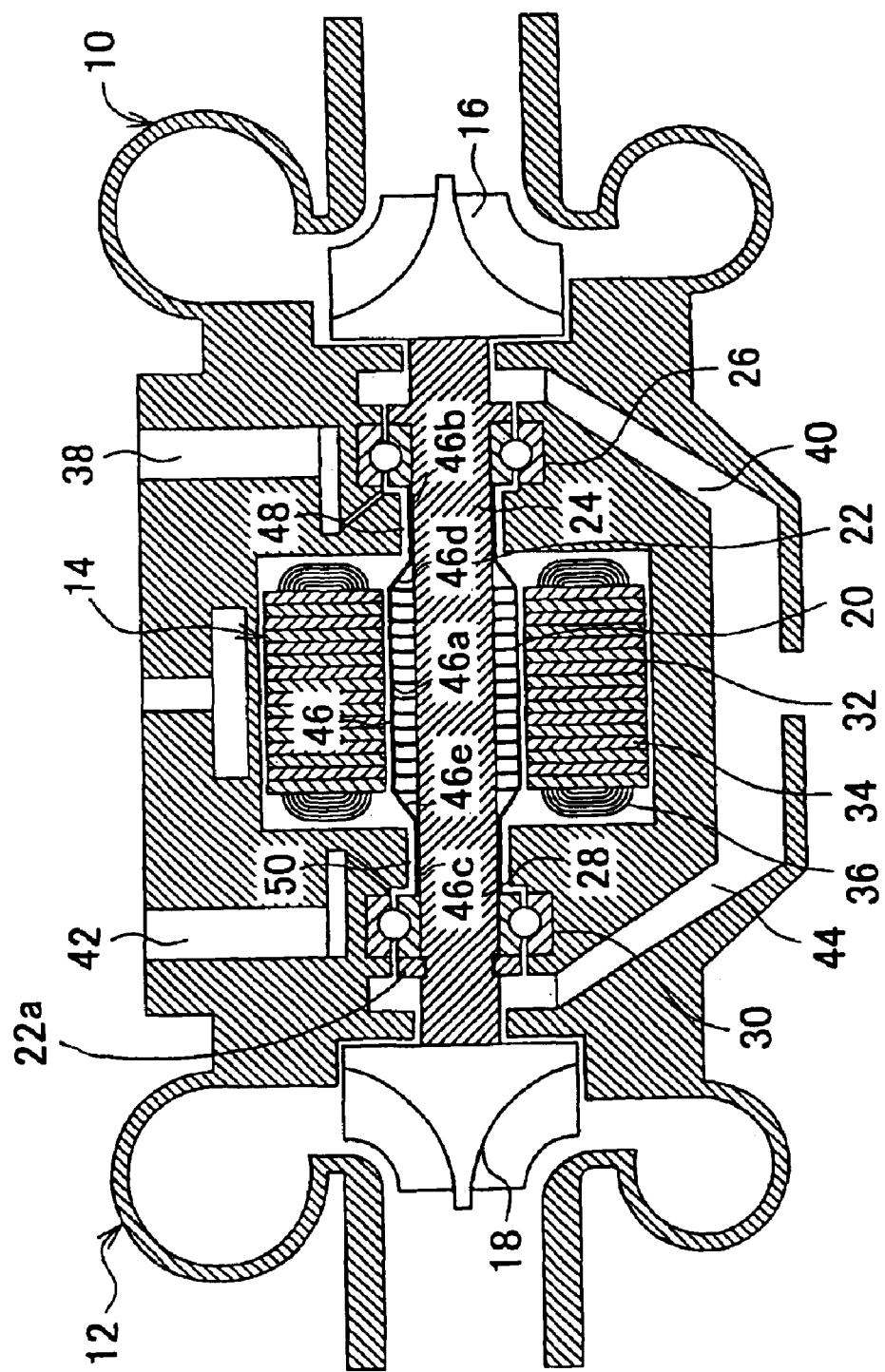
FIG. 1 is a longitudinal section view schematically showing a turbocharger according to a first embodiment of the invention, which includes a cylindrical member extending between bearings.

FIG. 1 is a longitudinal section view schematically showing a turbocharger with a rotating electric machine according to a first embodiment of the invention, which includes a cylindrical member extending between bearings. In FIG. 1, a reference numeral "10" signifies a turbine, a reference numeral "12" signifies a compressor, and a reference numeral "14" signifies a rotating electric machine. A shaft 22 which supports a turbine rotor 16, a compressor impeller 18, and a rotating electric machine rotor 20 is rotatably supported by a bearing 26 at a shaft portion 24 between the turbine rotor 16 and the rotating electric machine rotor 20. The shaft 22 has a snap ring 22a disposed at at least one end of the shaft 22 having a portion that is smaller than an inner diameter of the bearing 30. The snap ring 22a is attached after the shaft 22 is assembled to the bearings 30 and 26. Also, the shaft 22 is rotatably supported by a bearing 30 at a shaft portion 28 between the compressor impeller 18 and the rotating electric machine rotor 20. The rotating electric machine 14 includes a stator 32 which is provided around the rotating electric machine rotor 20. The stator 32 includes a core 34 and a coil 36 (only two representative ones are shown in FIG. 1).

The bearing 26 is lubricated and cooled by lubricating oil which is supplied from an oil passage 38 and released through an oil passage 40. The bearing 30 is lubricated and cooled by lubricating oil which is supplied from an oil passage 42 and released through an oil passage 44.

A reference numeral "46" signifies a cylindrical member provided according to the invention. The cylindrical member 46 encases the rotating electric machine rotor 20 at a center portion 46a, and contacts an inner race of the bearing 26 at an end portion 46b and an inner race of the bearing 30 at an end portion 46c. In the cylindrical member 46, a diameter reducing portion 46d, whose diameters is gradually reduced, is formed in a portion extending from the center portion 46a, which encases the rotating electric machine 20, to an end portions 46b. Also, a diameter reducing portion 46e, whose diameter is gradually reduced, is formed in a portion extending from the center portion 46a to an end portion 46c. In the embodiment shown in FIG. 1, the diameter of each of the diameter reducing portions 46d and 46e is gradually reduced such that the outline of the diameter reducing portion seen in the longitudinal section view has an angle of substantially 45 degrees, and each of the diameter reducing portions 46d and 46e is formed as a choanoid inclined surface. The diameter of the diameter reducing portion may be reduced at another angle. Alternatively, the diameter of the diameter reducing portion may be reduced in stages. Such a diameter reducing portion is configured to extend in a radial pattern. Therefore, the strength against a centrifugal force applied to the rotating member of the turbocharger during rotation thereof is increased. In addition, support of the center portion 46a in the centripetal direction, strength of the center portion 46a for encasing the rotating electric machine 20, and durability of the center portion 46a are all increased.

Due to provision of the cylindrical member 46, the cylindrical member 46 contacts the inner race of the bearings 26 at the end portions 46b and the inner race of the bearing 30 at the end portion 46c, while fully encasing the rotating electric machine rotor 20 at the center portion 46a. The cylindrical member 46 produces an effect of stably maintaining the axial position of the rotating electric machine rotor 20, and an effect of transferring the heat, which is recovered from the electric rotating machine rotor 20 at the center portion 46a, to the bearings 26 and 30, and releasing the heat to a lubricating cooling system using the lubricating oil. The lubricating oil is supplied from the oil passages 38 and 42, crosses the bearings 26 and 30, and released through the oil passages 40 and 44.

When part of the lubricating oil supplied from the oil passages 38 and 42 to the bearings 26 and 30 leaks through ring-shaped clearances 48 and 50, and adheres to the outer surfaces of the diameter reducing portions 46d and 46e, respectively, the lubricating oil is shaken off to the peripheral area due to a centrifugal force generated by rotation of the rotating member of the turbocharger. Accordingly, part of the heat, which is recovered by the cylindrical member 46 at the center portion 46a using the rotating electric machine rotor 20, is contained in an oil drop, and is released from the rotating electric machine rotor 20. In addition, in the embodiment in FIG. 1, the oil drop which is shaken off, is supplied particularly to the portion of the coil 36, and provides a better cooling effect to the stator 32 at the portion of the coil 36 having a high degree of roughness.

Figure 2:
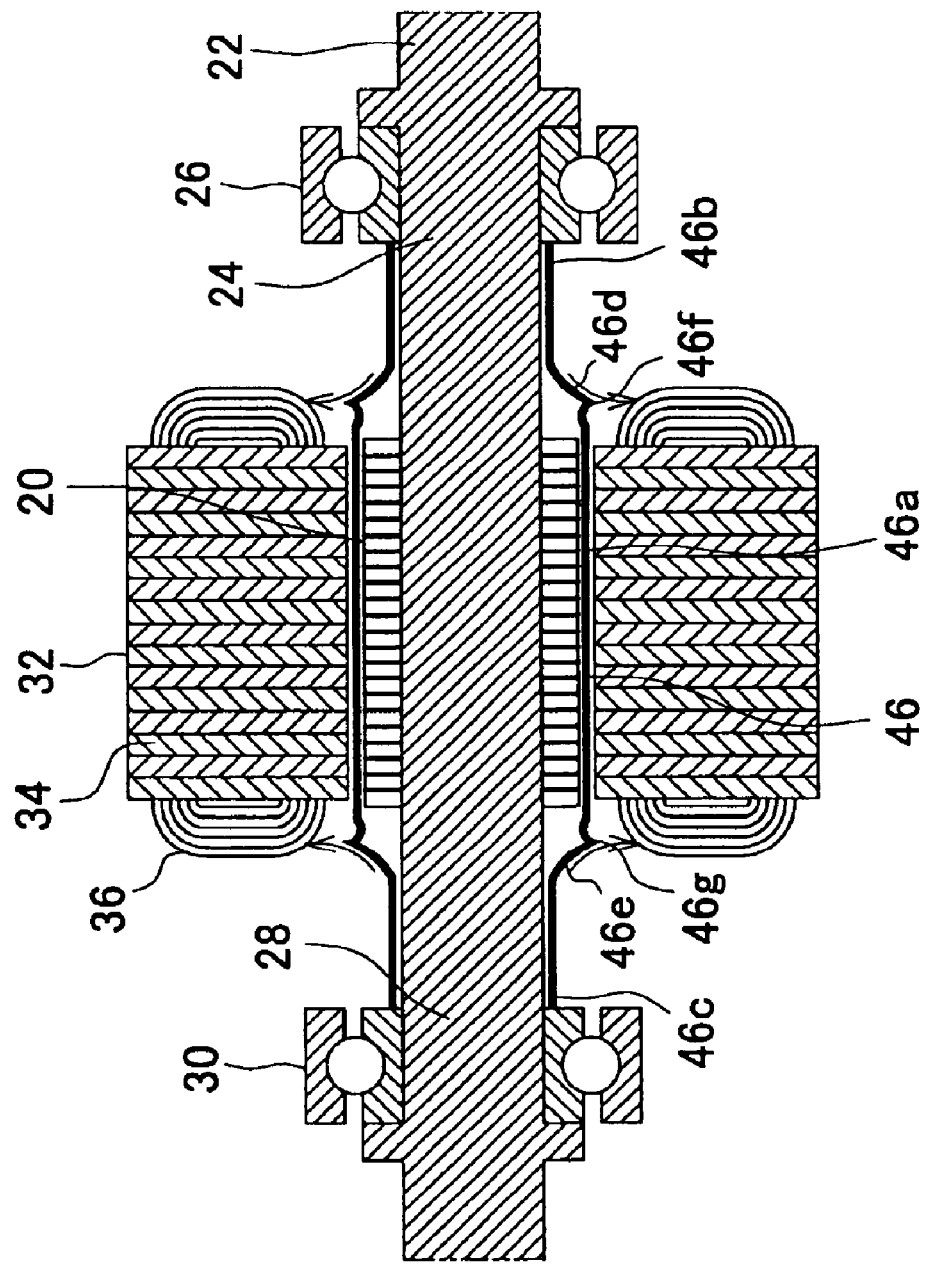
FIG. 2 is a longitudinal section view schematically showing only a rotating electric machine of a turbocharger according to a second embodiment of the invention. An outer peripheral end portion of each of diameter reducing portions of a rotating electric machine in FIG. 1 is formed to be an edge portion.

Hereafter, a turbocharger with a rotating electric machine according to a second embodiment will be described with reference to FIG. 2. FIG. 2 is a view showing a case where an edge portion, with which an oil drop can be released easily, is formed at each of outer peripheral end portions of the diameter reducing portions 46d and 46e, in order to enhance an effect of shaking off the oil, which adheres to the outer surfaces of the diameter reducing portions 46d and 46e of the cylindrical member, due to rotation of the rotating member of the turbocharger. FIG. 2 is a cross sectional view showing only the rotating member of the turbocharger shown in FIG. 1. In FIG. 2, the rotating electric machine portion is enlarged to a certain extent compared with that in FIG. 1. In FIG. 2, the same reference numerals are assigned to the same portions as those in FIG. 1. By forming the edge portion 46f at the outer peripheral end portion of the diameter reducing portion 46d, and the edge portion 46g at the outer peripheral end portion of the diameter reducing portion 46e, the oil adhering on the diameter reducing portions 46d and 46e is urged due to rotation of the rotating member of the turbocharger, drained from the outer peripheral end portions of the diameter reducing portions 46d and 46e with good drainage performance in the centrifugal direction, and shaken off toward the stator (toward the coil portion in the embodiment in FIG. 2).

Figure 3:
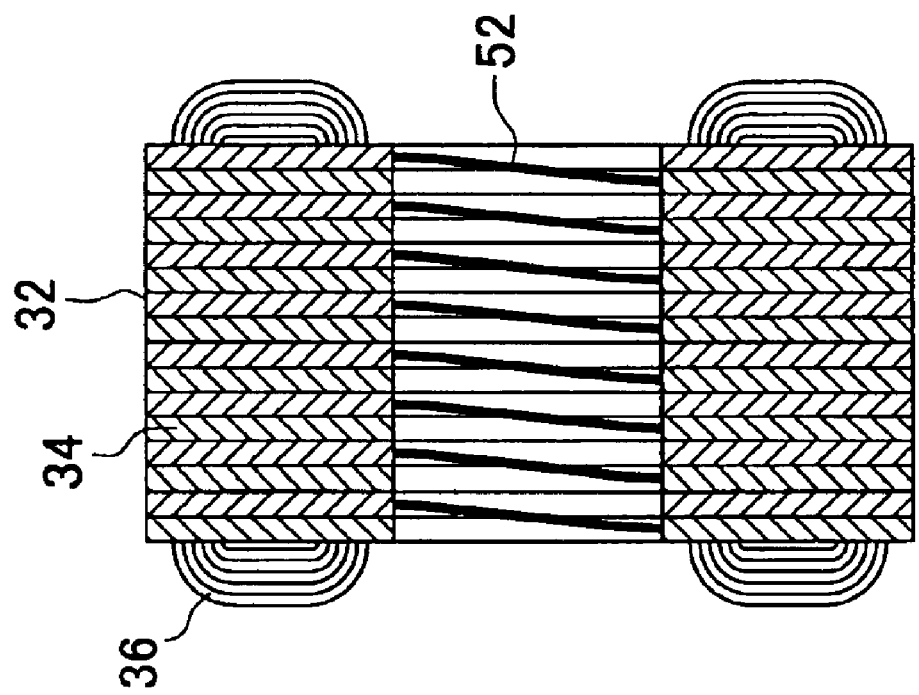
FIG. 3 is a longitudinal section view showing only a stator in a rotating electric machine of a turbocharger according to a third embodiment of the invention. A spiral groove is formed in an inner surface of the stator of the rotating electric machine in FIG. 1.

Next, a turbocharger with a rotating electric machine according to a third embodiment will be described with reference to FIG. 3. FIG. 3 is a view showing a case where a spiral groove is formed in an inner surface of the stator (more particularly, the core portion thereof) of the rotating electric machine. FIG. 3 is a cross sectional view showing only the stator of the rotating electric machine of the turbocharger shown in FIG. 1. In FIG. 3, the stator is enlarged to a certain extent compared with that in FIG. 1. In FIG. 3, the same reference numerals are assigned to the same portions as those in FIG. 1. When a spiral groove 52 is formed in the inner surface of the stator of the rotating electric machine, the air, which rotates in accordance with rotation of the rotating electric machine rotor 20, is guided by a side wall surface of the spiral groove 52, and moves in an axial direction of the rotating electric machine rotor 20. Therefore, an airflow is generated in a ring-shaped clearance between the rotating electric machine rotor and the stator, and the cooling effect provided to the rotating electric machine rotor and the stator is increased.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A turbocharger with a rotating electric machine, comprising
    a turbine rotor which constitutes a portion of a rotating member of the turbocharger;
    a compressor impeller which constitutes a portion of the rotating member of the turbocharger;
    a rotating electric machine which includes a stator and a rotor that constitutes a portion of the rotating member of the turbocharger;
    a shaft which supports the turbine rotor at one end and the compressor impeller at the other end, and which supports the rotor of the rotating electric machine at an intermediate portion;
    bearings each of which has an inner race and an outer race, and one of which supports the shaft at a portion between the one end and the intermediate portion, and the other of which supports the shaft at a portion between the other end and the intermediate portion; and
    a cylindrical member which encases the rotor of the rotating electric machine at a center portion and which directly contacts the inner race of one of the two bearings at one end portion and the inner race of the other of the two bearings at the other end portion.

2. The turbocharger with a rotating electric machine according to claim 1, wherein the cylindrical member has a diameter reducing portion at at least one of a portion extending from the center portion, which encases the rotor of the rotating electric machine, to one end portion and a portion extending from the center portion to the other end portion.

3. The turbocharger with a rotating electric machine according to claim 2, wherein the diameter reducing portion is formed such that a diameter of the diameter reducing portion is reduced from the center portion to the end portion in an axial direction of the shaft.

4. The turbocharger with a rotating electric machine according to claim 3, wherein the diameter reducing portion is provided at a position at which an oil drop, that is produced when oil adhering to an outer surface of the diameter reducing portion is shaken off by a centrifugal force due to rotation of the rotating member of the turbocharger, contacts the stator of the rotating electric machine.

5. The turbocharger with a rotating electric machine according to claim 2, wherein the diameter reducing portion is provided at a position at which an oil drop, that is produced when oil adhering to an outer surface of the diameter reducing portion is shaken off by a centrifugal force due to rotation of the rotating member of the turbocharger, contacts the stator of the rotating electric machine.

6. The turbocharger with a rotating electric machine according to claim 5, wherein a portion of the diameter reducing portion, which is near the center portion of the cylindrical member, is formed to be an edge portion.

7. The turbocharger with a rotating electric machine according to claim 6, wherein the diameter reducing portion is provided at a position at which an oil drop shaken off from an outer surface of the diameter reducing portion contacts a coil of the stator of the rotating electric machine.

8. The turbocharger with a rotating electric machine according to claim 5, wherein the diameter reducing portion is provided at a position at which an oil drop shaken off from an outer surface of the diameter reducing portion contacts a coil of the stator of the rotating electric machine.

9. The turbocharger with a rotating electric machine according to claim 8, wherein a spiral groove is formed in an inner surface of the stator of the rotating electric machine.

10. The turbocharger with a rotating electric machine according to claim 1, wherein a spiral groove is formed in an inner surface of the stator of the rotating electric machine.

* * * * *